C. C. BROWN AND R. H. RENFROE.
GRIPPING DEVICE FOR STEERING MECHANISMS.
APPLICATION FILED NOV. 29, 1916.
1,330,578.
Patented Feb. 10, 1920.
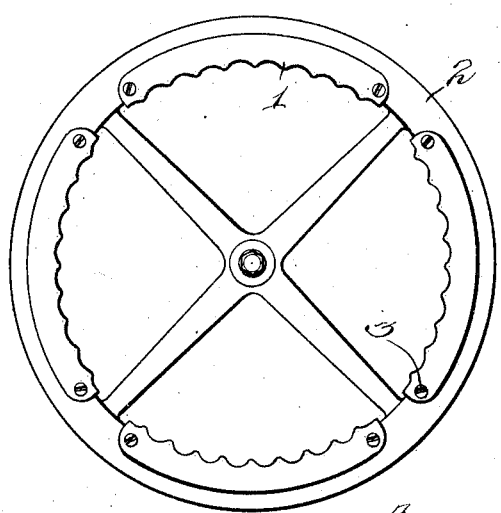
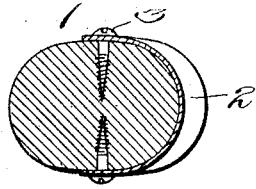
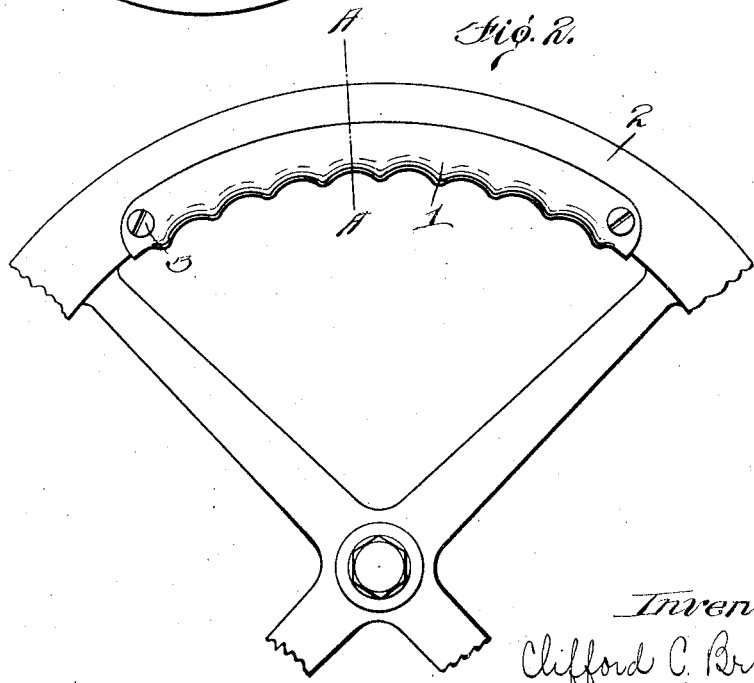

UNITED STATES PATENT OFFICE.

CLIFFORD C. BROWN AND ROBERT H. RENFROE, OF CARTERSVILLE, GEORGIA.

GRIPPING DEVICE FOR STEERING MECHANISMS.

1,330,578.     Specification of Letters Patent.     Patented Feb. 10, 1920.

Application filed November 29, 1916. Serial No. 134,045.

*To all whom it may concern:*

Be it known that we, CLIFFORD C. BROWN and ROBERT H. RENFROE, citizens of the United States, residing at Cartersville, in the county of Bartow and State of Georgia, have invented certain new and useful Improvements in Gripping Devices for Steering Mechanisms; and we do hereby declare the following to be a full, clear, and exact description of the invention, such as will enable others skilled in the art to which it appertains to make and use the same.

This invention relates to improvements in gripping devices for the steering mechanism of automobiles or other vehicles, and has for its object the provision of a gripping device whereby the operator may grasp the wheel firmly and operate the same without any slipping of the hand in the operation of turning the steering wheel.

With this and further objects in view, as will in part hereinafter become apparent and in part be stated, the invention comprises certain novel constructions, combinations and arrangements of parts as subsequently specified and claimed.

In the accompanying drawing,—

Figure 1 is a plan view of the steering wheel of an automobile embodying the features of the present invention.

Fig. 2 is an enlarged, fragmentary view showing one section of the gripping device.

Fig. 3 is a vertical, transverse section taken on the plane indicated by line A—A of Fig. 2.

Referring to the drawing by numerals, 1 indicates the hand gripping device which is secured to the steering wheel 2 by means of screws, or other suitable fastening devices 3. The steering wheel 2 is preferably provided with a plurality of these gripping devices 1 which are positioned on the wheel in such manner as to practically cover the entire gripping space of the steering wheel, so that in turning the said wheel the operator will at all times obtain a grip on the roughened surface and thus be enabled to grasp the steering wheel firmly, and so that in operating the wheel there will always be a positive action and no accident liable to be due from the hand slipping in the operation of turning the wheel and failing to respond to the efforts of the operator. The gripping devices 1 may be made of steel, leather, rubber, or any other suitable substance, and must be crimped or roughened in any other manner.

The part 1 is, as clearly seen in Fig. 3, formed of relatively thin sheet material and is of a length not greater than the distance between any two of the spokes of the steering wheel, so that the part 1 may be applied to any ordinary steering wheel now in use, and it is unnecessary, when so applying the gripping plate 1, to alter the cross sectional form or otherwise injure, the gripping rim of the steering wheel. Each gripping plate 1 may be applied merely by being positioned to partly surround and to extend along the inner surface of the gripping rim of the steering wheel, and the plate is then preferably secured in place by ordinary wood screws passed through apertures in the plate and threaded into the wood of the steering wheel rim. Other methods of connection may well be employed, but it is especially desirable that the gripping plates shall be capable of easy and ready application to any ordinary steering wheel not provided with serrations or roughened edges.

What we claim is:—

A plate attachment for an automobile steering wheel comprising a relatively thin sheet of material shaped to substantially conform transversely and longitudinally with the contour of the inner portion of the rim of a steering wheel substantially cylindrical in cross section, the inner surface of the plate having corrugations pressed therein to stiffen the sides and hold them in close relation to the wheel, and means for connecting the plate to said rim between the spokes of the steering wheel.

In testimony whereof we affix our signatures in presence of two witnesses.

CLIFFORD C. BROWN.
           ROBERT H. RENFROE.

Witnesses:
    CLAUD R. BROWN,
    F. C. WATKINS.